United States Patent
Lewis (10) Patent No.: US 10,273,811 B2
(45) Date of Patent: Apr. 30, 2019

(54) AXIAL SKIN CORE COOLING PASSAGE FOR A TURBINE ENGINE COMPONENT

(71) Applicant: United Technologies Corporation, Hartford, CT (US)

(72) Inventor: Scott D. Lewis, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 234 days.

(21) Appl. No.: 14/707,092

(22) Filed: May 8, 2015

(65) Prior Publication Data

US 2016/0326884 A1 Nov. 10, 2016

(51) Int. Cl.
- *F01D 5/18* (2006.01)
- *F02C 3/04* (2006.01)
- *F02C 7/18* (2006.01)
- *F01D 11/24* (2006.01)

(52) U.S. Cl.
CPC .............. *F01D 5/187* (2013.01); *F01D 11/24* (2013.01); *F02C 3/04* (2013.01); *F02C 7/18* (2013.01); *F05D 2220/32* (2013.01); *F05D 2240/11* (2013.01); *F05D 2240/304* (2013.01); *F05D 2260/203* (2013.01); *Y02T 50/673* (2013.01); *Y02T 50/676* (2013.01)

(58) Field of Classification Search
CPC . F01D 5/187; F01D 11/24; F01D 5/18; F01D 5/043; F01D 5/046; F01D 5/048; F01D 5/147; F01D 5/186; F02C 3/04; F02C 7/18; F05D 2220/32; F05D 2240/11; F05D 2240/304; F05D 2260/203; F05D 2240/305; F05D 2240/306; Y02T 50/676

USPC ........................................................ 415/115
See application file for complete search history.

(56) References Cited

U.S. PATENT DOCUMENTS

| | | | | |
|---|---|---|---|---|
| 2,879,028 A | * | 3/1959 | Stalker | F01D 5/183 416/219 R |
| 2,920,865 A | * | 1/1960 | Lombard | B64C 1/40 416/193 A |
| 3,017,159 A | * | 1/1962 | Foster | F01D 5/147 416/219 R |

(Continued)

FOREIGN PATENT DOCUMENTS

| EP | 0742347 | 11/1996 |
|---|---|---|
| EP | 1091092 | 4/2001 |

(Continued)

OTHER PUBLICATIONS

European Search Report for Application No. 16168779.3 dated Nov. 10, 2016.

(Continued)

*Primary Examiner* — Jason D Shanske
*Assistant Examiner* — Brian Christopher Delrue
(74) *Attorney, Agent, or Firm* — Carlson, Gaskey & Olds, P.C.

(57) ABSTRACT

A component for use in a turbine engine includes a fore edge connected to an aft edge via a first surface and a second surface. Multiple cooling passages are defined within the turbine engine component. A first skin core passage is defined immediately adjacent one of the first surface and the second surface. At least 80% of coolant entering the first skin core passage is expelled from the turbine engine component at the aft edge.

29 Claims, 5 Drawing Sheets

(56) References Cited

U.S. PATENT DOCUMENTS

| | | | | |
|---|---|---|---|---|
| 3,191,908 A * | 6/1965 | Petrie | F01D 5/187 | 416/96 R |
| 3,275,294 A * | 9/1966 | Allen | F01D 5/081 | 415/115 |
| 3,540,810 A * | 11/1970 | Kercher | F01D 5/189 | 415/115 |
| 3,574,481 A * | 4/1971 | Pyne, Jr. | F01D 5/189 | 416/90 R |
| 3,736,071 A * | 5/1973 | Kydd | F01D 5/08 | 415/115 |
| 3,844,678 A * | 10/1974 | Sterman | F01D 5/182 | 415/115 |
| 4,111,604 A * | 9/1978 | Kydd | F01D 5/185 | 416/92 |
| 4,153,386 A * | 5/1979 | Leogrande | F01D 5/186 | 415/115 |
| 4,218,178 A * | 8/1980 | Irwin | F01D 5/185 | 415/114 |
| 4,236,870 A * | 12/1980 | Hucul, Jr. | F01D 5/187 | 415/115 |
| 4,297,077 A * | 10/1981 | Durgin | F01D 5/189 | 415/115 |
| 4,314,442 A * | 2/1982 | Rice, IV | F01D 5/185 | 415/114 |
| 4,500,258 A * | 2/1985 | Dodd | F01D 5/187 | 416/96 R |
| 4,684,322 A * | 8/1987 | Clifford | F01D 5/187 | 415/175 |
| 4,770,608 A * | 9/1988 | Anderson | F01D 5/186 | 415/115 |
| 5,012,853 A * | 5/1991 | Bihlmaier | B22D 19/00 | 164/132 |
| 5,215,431 A * | 6/1993 | Derrien | F01D 5/187 | 415/115 |
| 5,243,759 A * | 9/1993 | Brown | B22C 9/10 | 164/122.1 |
| 5,378,108 A * | 1/1995 | Zelesky | F01D 5/187 | 415/115 |
| 5,392,515 A * | 2/1995 | Auxier | B23P 15/04 | 29/463 |
| 5,484,258 A * | 1/1996 | Isburgh | F01D 5/187 | 415/115 |
| 5,603,606 A * | 2/1997 | Glezer | F01D 5/187 | 415/115 |
| 5,660,524 A * | 8/1997 | Lee | F01D 5/182 | 415/115 |
| 5,702,232 A * | 12/1997 | Moore | F01D 5/186 | 416/95 |
| 5,813,836 A * | 9/1998 | Starkweather | F01D 5/187 | 415/173.4 |
| 5,820,337 A * | 10/1998 | Jackson | C22C 32/00 | 415/200 |
| 6,126,397 A * | 10/2000 | Kvasnak | F01D 5/187 | 415/115 |
| 6,254,334 B1 * | 7/2001 | LaFleur | F01D 5/186 | 415/115 |
| 6,290,463 B1 * | 9/2001 | Fargher | F01D 5/187 | 415/115 |
| 6,305,903 B1 * | 10/2001 | Semmler | F01D 5/187 | 416/97 R |
| 6,328,531 B1 * | 12/2001 | Bariaud | F01D 5/141 | 416/97 R |
| 6,551,062 B2 * | 4/2003 | Leeke | F01D 5/186 | 415/115 |
| 6,558,122 B1 * | 5/2003 | Xu | F01D 5/141 | 416/223 A |
| 6,773,230 B2 * | 8/2004 | Bather | F01D 5/186 | 415/115 |
| 6,913,064 B2 | 7/2005 | Beals et al. | | |
| 6,974,308 B2 * | 12/2005 | Halfmann | B22C 9/04 | 415/115 |
| 6,981,840 B2 * | 1/2006 | Lee | F01D 5/187 | 415/115 |
| 6,984,103 B2 * | 1/2006 | Lee | F01D 5/187 | 415/115 |
| 7,097,425 B2 | 8/2006 | Cunha et al. | | |
| 7,118,326 B2 * | 10/2006 | Liang | F01D 5/189 | 415/115 |
| 7,156,619 B2 * | 1/2007 | Papple | F01D 5/187 | 415/115 |
| 7,293,961 B2 * | 11/2007 | Lee | F01D 5/187 | 415/115 |
| 7,303,376 B2 * | 12/2007 | Liang | F01D 5/187 | 416/233 |
| 7,334,991 B2 * | 2/2008 | Liang | F01D 5/081 | 416/97 R |
| 7,390,168 B2 * | 6/2008 | Liang | F01D 5/186 | 416/97 R |
| 7,556,476 B1 * | 7/2009 | Liang | F01D 5/188 | 415/115 |
| 7,690,894 B1 * | 4/2010 | Liang | F01D 5/186 | 415/115 |
| 7,762,775 B1 * | 7/2010 | Liang | F01D 5/187 | 416/97 R |
| 7,780,413 B2 * | 8/2010 | Liang | F01D 5/186 | 416/97 R |
| 7,837,441 B2 | 11/2010 | Spangler et al. | | |
| 7,845,906 B2 * | 12/2010 | Spangler | F01D 5/186 | 416/97 R |
| 8,105,033 B2 * | 1/2012 | Hudson | F01D 5/187 | 416/97 R |
| 8,231,329 B2 * | 7/2012 | Benjamin | F01D 5/188 | 415/115 |
| 8,511,994 B2 * | 8/2013 | Devore | F01D 5/187 | 416/97 R |
| 8,721,285 B2 * | 5/2014 | Liang | F01D 5/187 | 415/115 |
| 8,985,940 B2 * | 3/2015 | Zhang | F01D 5/081 | 415/115 |
| 8,985,949 B2 * | 3/2015 | Lee | F01D 5/187 | 416/97 R |
| 9,017,025 B2 * | 4/2015 | Lee | F01D 5/187 | 416/97 R |
| 9,121,290 B2 * | 9/2015 | Jenne | F01D 5/187 | |
| 9,296,039 B2 * | 3/2016 | Propheter-Hinckley | B22C 9/10 | |
| 9,528,382 B2 * | 12/2016 | Morgan | F01D 5/147 | |
| 2001/0012484 A1 * | 8/2001 | Beeck | B22D 11/0405 | 416/97 R |
| 2002/0187043 A1 * | 12/2002 | Liang | F01D 5/186 | 416/97 R |
| 2004/0076519 A1 * | 4/2004 | Halfmann | B22C 9/04 | 416/97 R |
| 2005/0006047 A1 * | 1/2005 | Wang | B22C 9/10 | 164/516 |
| 2005/0111977 A1 * | 5/2005 | Lee | F01D 5/187 | 416/97 R |
| 2005/0118882 A1 | 6/2005 | Chiang et al. | | |
| 2006/0093480 A1 | 5/2006 | Cunha et al. | | |
| 2006/0107668 A1 * | 5/2006 | Cunha | F01D 5/18 | 60/806 |
| 2007/0104576 A1 * | 5/2007 | Cunha | B22C 9/04 | 416/97 R |
| 2007/0116569 A1 * | 5/2007 | Cunha | B22C 9/06 | 416/97 R |
| 2008/0145234 A1 * | 6/2008 | Lee | B22C 9/103 | 416/96 R |
| 2008/0273963 A1 | 11/2008 | Spangler et al. | | |
| 2009/0185903 A1 * | 7/2009 | Beeck | F01D 5/145 | 416/91 |
| 2009/0238695 A1 * | 9/2009 | Devore | F01D 5/187 | 416/97 R |
| 2011/0123311 A1 * | 5/2011 | Devore | F01D 5/187 | 415/115 |
| 2011/0274559 A1 * | 11/2011 | Jenne | F01D 5/187 | 416/97 R |

(56) References Cited

U.S. PATENT DOCUMENTS

| | | | |
|---|---|---|---|
| 2013/0017064 A1* | 1/2013 | Naik | F01D 5/187 415/115 |
| 2013/0156599 A1* | 6/2013 | Ahmad | F01D 5/187 416/96 R |
| 2013/0216395 A1* | 8/2013 | Bregman | F01D 5/187 416/97 R |
| 2013/0243575 A1 | 9/2013 | Lelesky et al. | |
| 2013/0280091 A1* | 10/2013 | Propheter-Hinckley | B22C 9/10 416/97 A |
| 2014/0127013 A1 | 5/2014 | Spangler et al. | |
| 2014/0271129 A1 | 9/2014 | Mueller et al. | |

FOREIGN PATENT DOCUMENTS

| | | |
|---|---|---|
| EP | 1783327 | 5/2007 |
| EP | 1790822 | 5/2007 |
| EP | 2546007 | 1/2013 |
| WO | 0100964 | 1/2001 |
| WO | 2015006026 | 1/2015 |
| WO | 2015065718 | 5/2015 |

OTHER PUBLICATIONS

European Search Report for Application No. 16168748.8 dated Sep. 29, 2016.

* cited by examiner

AXIAL SKIN CORE COOLING PASSAGE FOR A TURBINE ENGINE COMPONENT

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

TECHNICAL FIELD

The present disclosure relates generally to turbine engine components, such as blades, and more specifically to a turbine engine component including an axially aligned skin core cooling passage.

BACKGROUND

Gas turbine engines, such as those utilized in commercial and military aircraft, utilize a compressor section to draw air into a flow path, a combustor section to mix compressed air with a fuel and ignite the mixture, and a turbine section to expand the resultant combustion products. The expansion of the resultant combustion products drives the turbine section to rotate, which in turn drives the compressor section to rotate.

As a result of the exposure to combustion products, components within the turbine section are subject to extreme heat. To prevent heat related fatigue and damage, the turbine components are actively cooled via internal cooling flow paths. Frequently air, or another coolant, is expelled from the internal cooling passages along the surface of the turbine engine component to create a film cooling effect on the exterior surface of the turbine engine component.

SUMMARY OF THE INVENTION

In one exemplary embodiment a turbine engine component includes a fore edge connected to an aft edge via a first surface and a second surface, a plurality of cooling passages defined within the turbine engine component, and a first skin core passage defined immediately adjacent one of the first surface and the second surface, wherein approximately 100% of coolant entering the first skin core passage is expelled from the turbine engine component at the aft edge.

In another exemplary embodiment of the above described turbine engine component, the turbine engine component has an airfoil shaped profile, the fore edge is a leading edge, the aft edge is a trailing edge, the first surface is a suction side and the second surface is a pressure side.

In another exemplary embodiment of any of the above described gas turbine components, the first skin core passage extends along the pressure side.

In another exemplary embodiment of any of the above described gas turbine components, the first skin core passage defines an axial flow path relative to an axis defined by a turbine engine including the turbine engine component.

In another exemplary embodiment of any of the above described gas turbine components, each of the plurality of cooling passages is a section of a single cooling flow path.

In another exemplary embodiment of any of the above described gas turbine components, the first skin core passage has a constant axial width.

In another exemplary embodiment of any of the above described gas turbine components, the first skin core passage has a varied axial width.

In another exemplary embodiment of any of the above described gas turbine components, the axial width of the first skin core passage is minimized at the aft edge.

In another exemplary embodiment of any of the above described gas turbine components, the plurality of cooling passages further includes at least one radially aligned skin core passage defining a radial cooling air flow path section relative to an axis defined by the turbine engine including the turbine engine component.

In another exemplary embodiment of any of the above described gas turbine components, the radial skin core passage is immediately adjacent one of the first surface and the second surface opposite the one of the first surface and the second surface to which the first skin core passage is immediately adjacent.

In another exemplary embodiment of any of the above described gas turbine components, the turbine engine component is one of a blade outer air seal, a combustor liner, a blade and a vane.

In another exemplary embodiment of any of the above described gas turbine components, the turbine engine component is a blade in a second or later turbine stage.

In one exemplary embodiment a gas turbine engine includes a compressor section, a combustor section fluidly connected to the compressor section by a flowpath, a turbine section fluidly connected to the combustor section by the flowpath, at least one gas turbine engine component exposed to a fluid passing through the flowpath. The at least one gas turbine engine component includes a fore edge connected to an aft edge via a first surface and a second surface, at least one cooling passage defined within the turbine engine component, a first skin core passage defined immediately adjacent the first surface, wherein approximately 100% of coolant entering the first skin core passage is expelled from the turbine engine component at the aft edge.

In another exemplary embodiment of the above described gas turbine engine, coolant expelled from the turbine engine component at the aft edge is expelled into the flowpath.

In another exemplary embodiment of any of the above described gas turbine engines, each at least one cooling passage and the first skin core passage are sections of a singular cooling flowpath In another exemplary embodiment of any of the above described gas turbine engines, the first skin core passage defines an axial flow relative to an axis defined by the gas turbine engine.

In another exemplary embodiment of any of the above described gas turbine engines, the first skin core passage has a constant axial width.

An exemplary method for constructing an engine component includes defining a negative image of at least one internal cooling passage and an axial skin core passage connected to the at least one internal cooling passage, casting a material about the negative image, and removing the negative image from a cast component.

In a further example of the above exemplary method, defining a negative image includes defining the negative image using a refractory metal core and wherein casting the material about the negative image is an investment casting process.

In a further example of any of the above exemplary methods, defining a negative image includes defining the negative image using a ceramic core.

These and other features of the present invention can be best understood from the following specification and drawings, the following of which is a brief description.

DETAILED DESCRIPTION OF AN EMBODIMENT

Figure 1:
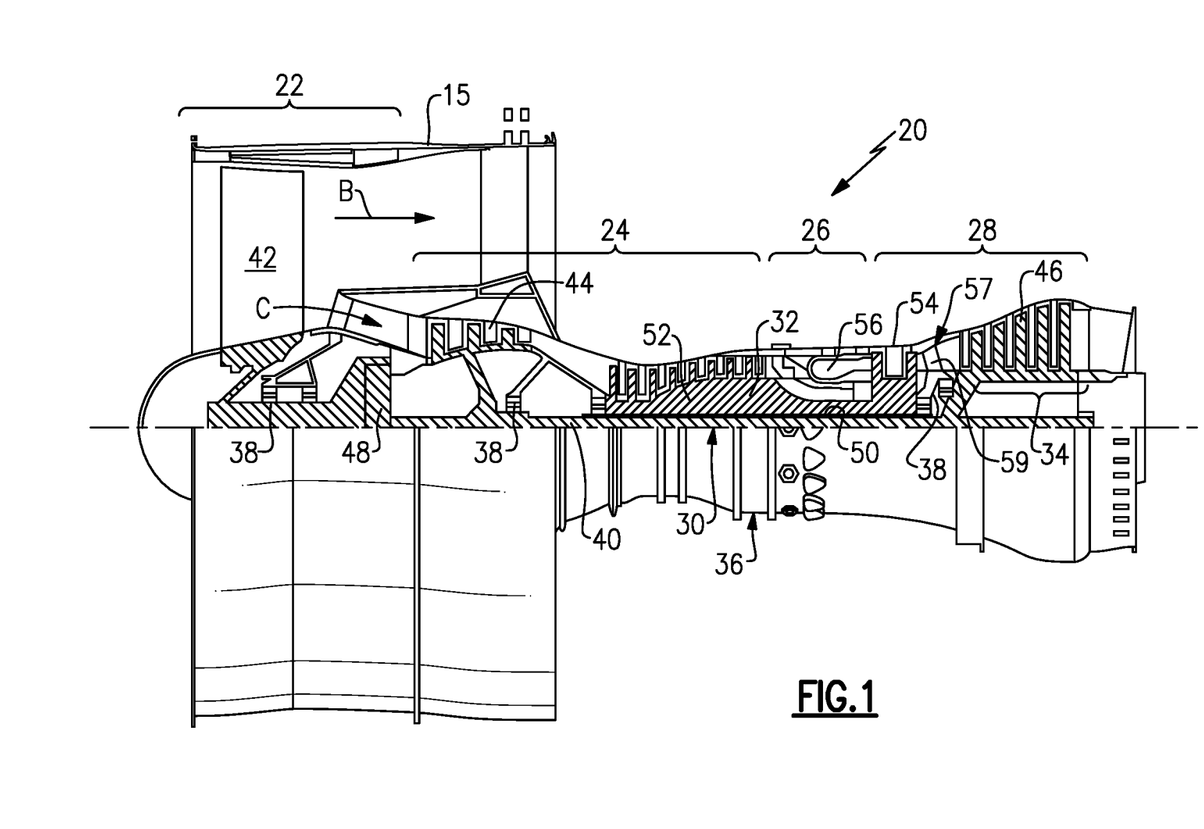
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second.

Multiple components within the turbine section 28 include internal cooling passages for active cooling. Cooling air is typically drawn from the compressor section 24, such as via a compressor bleed, and provided to the cooled turbine component. Turbine engine components exposed to the hottest temperatures, such as turbine blades and vanes in the first stage aft of the combustor section 26, are allocated the highest amount of cooling air (referred to as the cooling air budget). Later stages of vanes, blades, blade outer air seals, and other turbine engine components that are further downstream are provided a limited cooling air budget, relative to the cooling air budget of the first stage blade.

While film cooling is frequently employed as a cooling method, film cooling produces a significant drop in coolant pressure at the film cooling holes. In a blade, or other turbine engine component, having a limited cooling air budget, the resultant pressure drop can reduce the ability to provide internal cooling downstream of the film cooling holes.

Figure 2:
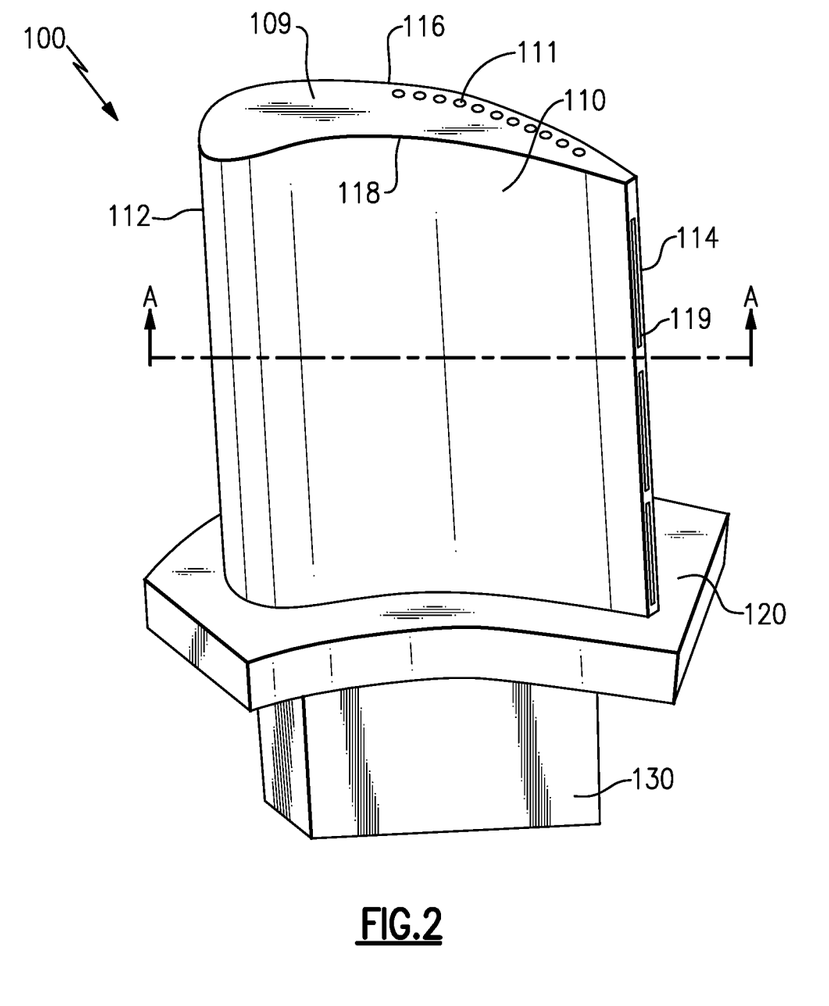
FIG. 2 schematically illustrates a turbine engine component.

With continued reference to FIG. 1, FIG. 2 illustrates an exemplary turbine second stage blade 100. The turbine second stage blade 100 includes a blade portion 110 extending from a platform 120 into the primary flow path of the gas turbine engine 20. A root portion 130 is received in the gas turbine engine static support structure, and maintains the turbine second stage blade 100 in position. The blade portion 110 has a forward edge, referred to as a leading edge 112, and an aft edge, referred to as a trailing edge 114. A cross section A-A of the blade portion 110 drawn from the leading edge 112 to the trailing edge 114 has an airfoil shaped profile (illustrated in FIGS. 3 and 4) with a suction surface 116 and a pressure surface 118 connecting the leading edge 112 to the trailing edge 114.

Figure 3A:
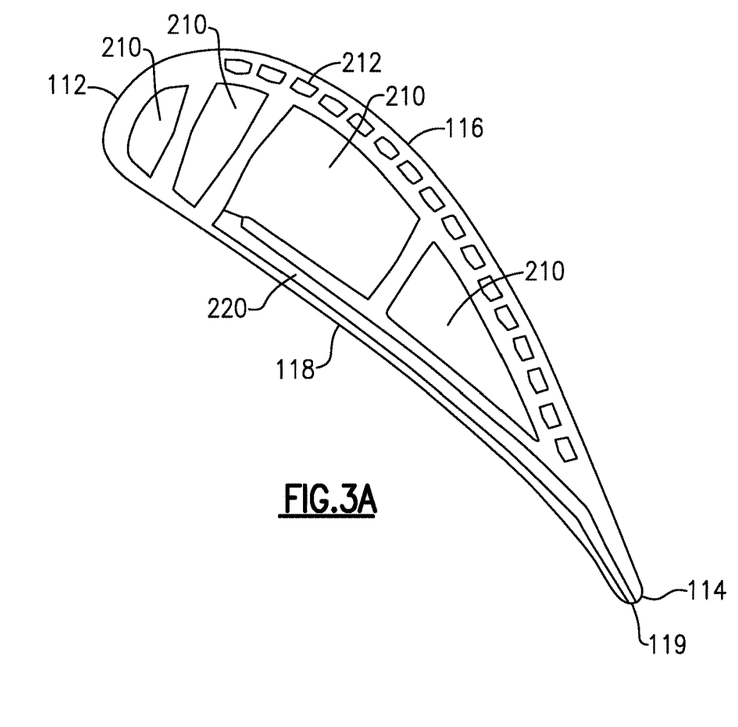
FIG. 3A schematically illustrates a cross section of a first example turbine engine component according to FIG. 2.
Figure 3B:
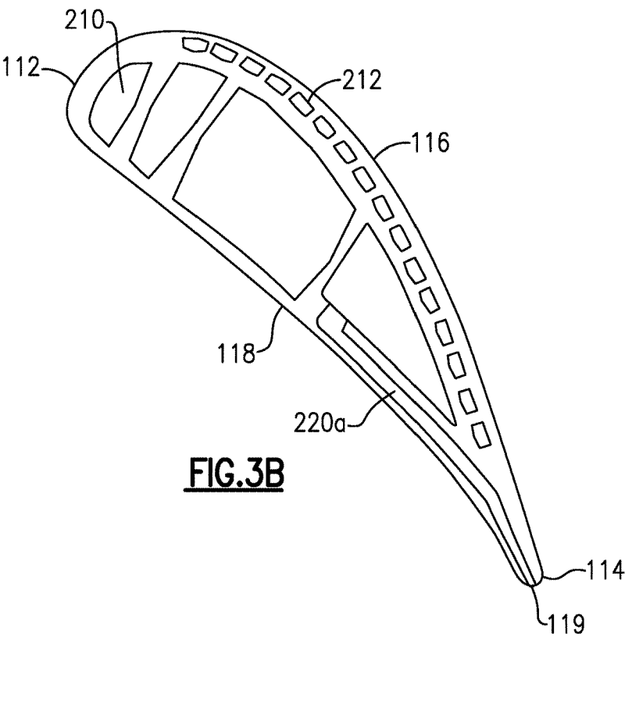
FIG. 3B schematically illustrates a cross section of a second example turbine engine component according to FIG. 2.
Figures 4, 5:
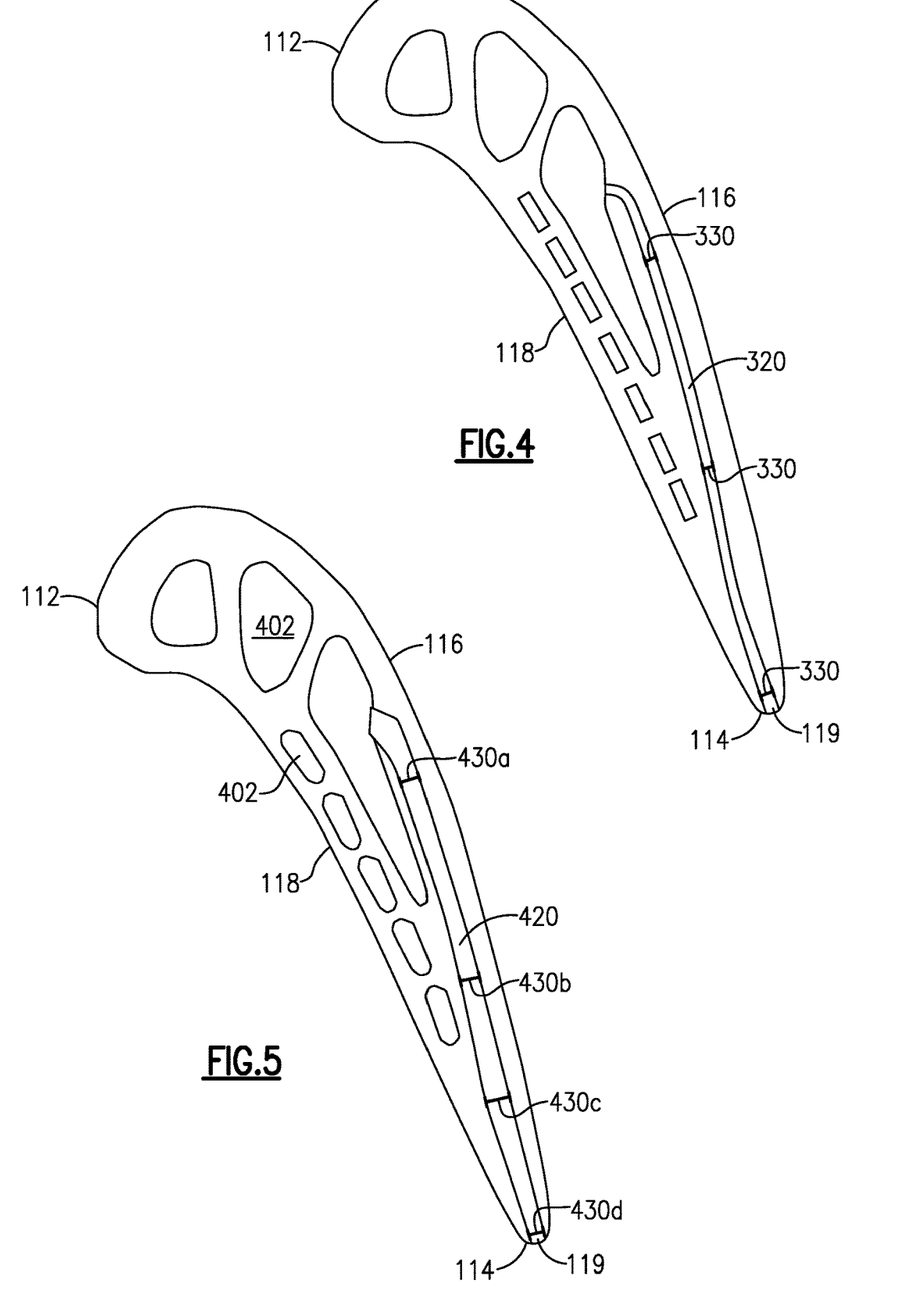
FIG. 4 schematically illustrates a cross section of an alternate example turbine engine component.
FIG. 5 schematically illustrates a cross section of another alternate example turbine engine component.

Included within the blade portion 110 are multiple radially aligned internal cooling passages 210 (illustrated in FIGS. 3 and 4). The radially aligned internal cooling passages 210 form an internal cooling air flow path. Along one surface of the blade portion 110, such as the pressure surface 118, is an axially aligned skin core passage 220, 220a (illustrated in FIGS. 3 and 4). The axially aligned skin core passage 220, 220a defines an axial flow path, and passes cooling air internally along the surface 118, thereby cooling the surface 118. Cooling air entering the axially aligned skin core passage 220, 220a exits the blade portion 110 through slots 119 in the trailing edge 114. In some example embodiments additional openings 111 connect the axially aligned skin core passage 220, 220a to a radially outward surface of the tip portion 109. In such examples, a small portion of the air passing through the axially aligned skin core passage 220, 220a exits through the openings 111. The small portion of the air passing through the axially aligned skin core passage 220, 220a that exits through the openings 111 can be less than 20% of the air in some examples, and less than 5% of the air in some examples. In alternative examples, the slots 119 can be replaced with multiple holes, or a single slot extending the full radial height of the axially aligned skin core passage 220, 220a.

In some examples, the blade 100, illustrated in FIG. 2, is created utilizing an investment casting process. In alternative examples, the second stage blade 100 can be created using a process other than investment casting. In either case, the blade 100 is cast around a core defining a negative image of the internal cooling passages of the blade 100. The core is then removed from the component leaving the cooling passages empty. A skin core passage, such as the above described skin core passage, is a passage formed around a thin sheet of material that conforms with the shape of the surface along which the skin core passage extends. In the example of FIG. 2, the blade portion 110 is formed around the thin sheet of material, and the thin sheet is removed from the formed blade portion 110 once the second stage blade 100 has been cast. The result is a thin passage that extends along the surface to which the skin core passage is adjacent. Cooling air passing through the skin core passage 220 absorbs heat from the surface via convection, allowing for the surface to be actively cooled.

With continued reference to FIG. 2, FIG. 3A illustrates a first example cross section 200 drawn along cross section A-A. In the example cross section 200 of FIG. 3, multiple cooling passages 210 are defined between the suction surface 116 and the pressure surface 118. The cooling passages 210 are radially aligned so that a coolant, such as cooling air, flows through the cooling passage 210 radially relative to an axis defined by the gas turbine engine including the second stage blade 100. Each of the passages 210 is interconnected with at least one of the other passages 210 such that the passages 210 form a single cooling flow path through the second stage blade 100.

Defined immediately adjacent to the suction surface 116 are multiple radially aligned skin core passages 212. In alternative examples, a single radially aligned skin core passage may be utilized in place of the multiple passages 212. In yet further alternate examples, the radially aligned skin core passages 212 are omitted entirely.

Immediately adjacent the pressure surface 118 of the second stage blade 100 is an axially aligned skin core passage 220. The axially aligned skin core passage 220 defines an axial coolant flow path, relative to the gas turbine engine including the second stage blade 100. Due to the reduced cooling air budget of the second stage blade 100, relative to a first stage blade, no film cooling holes or film cooling slots are included along the length of the axially aligned skin core passage 220. The lack of film cooling holes maintains the cooling air pressure throughout the axially aligned skin core passage 220 until the cooling air is expelled at the trailing edge 114 through cooling air outflow slots 119, or through openings connecting the axially aligned skin core passage 220 to the tip.

The axially aligned skin core passage 220 illustrated in FIG. 3A extends a majority of the axial length of the pressure surface 118, prior to being expelled out the slots 119. With continued reference to FIG. 3A, FIG. 3B illustrates an alternate example cross section 200 drawn along cross section A-A, where the axially aligned skin core passage 220a extends less than 50% of the axial length of the pressure surface 118. The alternate example configuration illustrated in FIG. 3B can be utilized when only the aft portion of the pressure surface 118 requires the increased cooling provided by the skin core passage 220, or when the cooling budget is insufficient to allow for a full axial length cooling skin core passage 220.

In each of the examples of FIGS. 3A and 3B, the utilization of the outlet slot 119 at the trailing edge allows approximately 100% of the cooling air entering the axially aligned skin core passage 220, 220a to be expelled from the second stage blade 100 at the trailing edge. In other words, no cooling air is expelled from the axially aligned skin core passage 220, 220a upstream of an outlet disposed at an aft most edge of the axially aligned skin core passage 220, 220a. In alternative examples, the above described openings connecting the tip of the blade to the axially aligned skin core passage 220, 220a can allow a small portion of the cooling air to be expelled radially outward of the blade at the tip. In some examples, the amount of air expelled at the tip can be less than 20%. In other examples the amount of air expelled at the tip can be less than 5%.

With continued reference to FIGS. 1-3B, FIG. 4 illustrates an alternative cross section of the second stage blade 100 constructed using a refractory metal core. As with the example of FIG. 3A, the blade portion 110 includes a leading edge 112, a trailing edge 114, a pressure surface 118 and a suction surface 116. In the illustrated example of FIG. 4, an axially aligned skin core passage 320 extends along the suction surface 116, and provides cooling airflow as described above with regards to FIGS. 3A and 3B. The utilization of a refractory metal core for the casting results in an axial skin core passage 320 that has a uniform width 330 for the full length of the axial skin core passage 320. The uniform width 330 created by the refractory metal core can be extremely small, relative to other methods of creating cooling passages within a turbine engine component.

With continued reference to FIGS. 1-4, FIG. 5 illustrates the cross section of the second stage blade 100 illustrated in FIG. 4, cast around a ceramic core rather than a refractory metal core. Internal cooling passages 402 defined by the ceramic core are larger than the internal passages defined by a refractory metal core. Utilization of a ceramic core in the casting process further allows a width 430a-d of the skin core passage 420 to be varied along the axial length of the skin core passage 420. In the example of FIG. 5, the width 430a at an entryway to the axial skin core passage 420 is maintained constant through a width 430b at the midway point through the axial skin core passage 420. After the midway point the width slightly increases to a maximum width 430c, after which the width 430 is decreased to a minimum width 430d at the trailing edge 114. By varying the width 430 of the skin core passage 420, the speed at which cooling air is passed through the axial skin core passage 420 can be locally accelerated (when the width is narrower) and locally decelerated (when the width is wider) to adjust the convection capabilities of the cooling air passing through the skin core passage 420 for particular hot spots and cold spots.

With general reference to FIGS. 2-5, an axially aligned skin core passage that passes all coolant entering the skin core passage to an aft most exit to the skin core passage is capable of providing convective cooling to a surface of the turbine engine component without cooling air pressure loss when the cooling air budget provided to the turbine engine component is low.

In some examples, an axially aligned skin core passage, such as is described above, can be utilized in conjunction with a cooling flow that has sufficient cooling air budget for film cooling upstream of the axially aligned skin core, or in a turbine engine component that utilizes multiple cooling air flow paths through the turbine engine component where one of the cooling air flow paths has sufficient budget for film cooling, but the cooling air flow path feeding the axially aligned skin core passage lacks sufficient budget. In such an example, it can be beneficial to provide film cooling from the cooling air flow path, or the upstream portion of the cooling air flow path, where there is sufficient cooling air budget. However, inclusion of the axially aligned skin core passage prevents a direct film cooling hole between the higher budget cooling flow and the surface of the turbine engine component receiving film cooling.

While described above with regards to blades in general, and a second stage blade in a turbine section of a gas turbine engine in particular, one of skill in the art having the benefit of this disclosure will understand that the above described skin core cooling passage and pedestal arrangement can be applied to any number of actively cooled turbine engine components including, vanes, blades, blade outer air seals, and the like.

Figure 6:
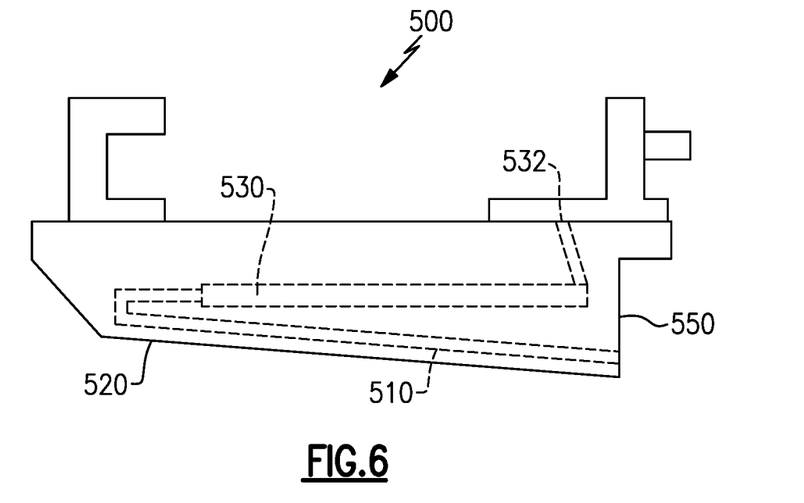
FIG. 6 illustrates an exemplary Blade Outer Air Seal including an axially aligned skin core.

By way of example, FIG. 6 illustrates an exemplary blade outer air seal (BOAS) 500, including an axially aligned skin core passage 510 providing cooling to a radially interior surface 520 of the BOAS 500. The skin core passage 510 receives cooling air from at least one internal cooling passage 530 that in return receives cooling air from a cooling air inlet 532. The skin core passage 510 extends axially along the radially inward surface 520 of the BOAS 500, and defines an axial flowpath. An outlet of the skin core passage 510 is positioned at an aft edge 550 of the BOAS 500. The outlet expels cooling air from the skin core passage 510 into a primary flowpath. The positioning of the cooling air inlet 532, and the internal cooling air passages 530 may be varied depending on the particular needs and configuration of a given engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine component comprising:
a fore edge connected to an aft edge via a first surface and a second surface, and wherein each of the first surface and the second surface terminate at a same location on the aft edge;
a plurality of cooling passages defined within the turbine engine component;
a first skin core passage defined immediately adjacent one of said first surface and said second surface, wherein at least 80% of coolant entering said first skin core passage is expelled from said turbine engine component at said aft edge and wherein coolant expelled from said first skin core passage at said aft edge is expelled via a slot portion having at least one slot, the slot portion including at least one slot having a portion at a radially inward end of the aft edge and the slot portion having at least one slot including a portion at a radially outward end of the aft edge;
wherein each of said slots in the slot portion is defined by an outlet cross section having a dimension aligned with a radial length of the turbine engine component, and the dimension aligned with the radial length of the turbine engine component is larger than any other dimension of the outlet cross section; and
wherein said skin core passage is a passage formed about a thin sheet of material and the skin core passage conforms with the shape of the one of said first surface and said second surface along which the skin core passage extends.

2. The turbine engine component of claim 1, wherein said turbine engine component has an airfoil shaped profile, said fore edge is a leading edge, said aft edge is a trailing edge, said first surface is a suction side and said second surface is a pressure side.

3. The turbine engine component of claim 2, wherein said first skin core passage extends along said pressure side.

4. The turbine engine component of claim 1, wherein said first skin core passage defines an axial flow path relative to an axis defined by a turbine engine including the turbine engine component.

5. The turbine engine component of claim 1, wherein each of said plurality of cooling passages is a section of a single cooling flow path.

6. The turbine engine component of claim 1, wherein said first skin core passage has a constant axial width.

7. The turbine engine component of claim 1, wherein said first skin core passage has a varied axial width.

8. The turbine engine component of claim 7, wherein the axial width of the first skin core passage is minimized at the aft edge.

9. The turbine engine component of claim 8, wherein the axial width of the first skin core passage is maximized between a midway point through the first skin core passage and the aft edge.

10. The turbine engine component of claim 9, wherein the axial width from an inlet of the first skin core passage to the midway point of the first skin core passage is maintained constant.

11. The turbine engine component of claim 1, wherein the at least one slot comprises a single slot extending approximately a full radial height of the first skin core passage.

12. The turbine engine component of claim 1, wherein the at least one slot comprises a plurality of slots, the portion at the radially inward end of the aft edge being a first slot and the portion at the radially outward end being a second slot.

13. The turbine engine component of claim 1, wherein the plurality of cooling passages further includes at least one radially aligned skin core passage defining a radial cooling air flow path section relative to an axis defined by a turbine engine including the turbine engine component.

14. The turbine engine component of claim 13, wherein the radial skin core passage is immediately adjacent one of said first surface and said second surface opposite the one of said first surface and the second surface to which the first skin core passage is immediately adjacent.

15. The turbine engine of claim 1, wherein the turbine engine component is one of a blade outer air seal, a combustor liner, a blade and a vane.

16. The turbine engine component of claim 15, wherein the turbine engine component is a blade in a second or later turbine stage.

17. The turbine engine component of claim 1, wherein the first skin core passage extends less than 50% of an axial length of the turbine engine component.

18. The turbine engine component of claim 1, wherein the first skin core passage spans at least 50% of a radial height of said first surface.

19. The turbine engine component of claim 1, wherein the component has a radially outward facing surface, the radially outward facing surface including openings connecting the radially outward facing surface to the first skin core passage.

20. The turbine engine component of claim 19, wherein the openings are metered such that less than 20% of air entering the first skin core passage is expelled radially outward.

21. The turbine engine component of claim 19, wherein the openings are metered such that less than 5% of air entering the first skin core passage is expelled radially outward.

22. A gas turbine engine comprising:
a compressor section;
a combustor section fluidly connected to the compressor section by a flowpath;
a turbine section fluidly connected to the combustor section by the flowpath;
at least one gas turbine engine component exposed to a fluid passing through said flowpath, the at least one gas turbine engine component including:
a fore edge connected to an aft edge via a first surface and a second surface, wherein each of the first surface and the second surface terminate at a same location on the aft edge;
at least one cooling passage defined within the turbine engine component;
a first skin core passage defined immediately adjacent said first surface, wherein at least 80% of coolant entering said first skin core passage is expelled from said turbine engine component at said aft edge and wherein coolant expelled from said first skin core passage at said aft edge is expelled via a slot portion having at least one slot, the slot portion including at least one slot having a portion at a radially inward end of the aft edge and the slot portion having at least one slot including a portion at a radially outward end of the aft edge;
wherein each of said slots in the slot portion is defined by an outlet cross section having a dimension aligned with a radial length of the gas turbine engine component, and the dimension aligned with the radial length of the gas turbine engine component is larger than any other dimension of the outlet cross section; and
wherein said skin core passage is a passage formed about a thin sheet of material and the skin core passage conforms with the shape of the one of said first surface and said second surface along which the skin core passage extends.

23. The gas turbine engine of claim 22, wherein coolant expelled from said turbine engine component at said aft edge is expelled into said flowpath.

24. The gas turbine engine of claim 22, wherein each said at least one cooling passage and said first skin core passage are sections of a singular cooling flowpath.

25. The gas turbine engine of claim 22, wherein the first skin core passage defines an axial flow relative to an axis defined by the gas turbine engine.

26. The gas turbine engine of claim 22, wherein the first skin core passage has a constant axial width.

27. A method for constructing an engine component comprising:
defining a negative image of at least one internal cooling passage and an axial skin core passage including an aft edge outlet having a slot portion including at least one slot, the slot portion including at least one slot having a portion at a radially inward end of the aft edge and the slot portion including at least one slot having a portion at a radially outward end of the aft edge, the axial skin core passage being connected to the at least one internal cooling passage, wherein each of said slots in the slot portion is defined by an outlet cross section having a dimension aligned with a radial length of the engine component, and the dimension aligned with the radial length of the engine component is larger than any other dimension of the outlet cross section, and wherein said skin core passage is a passage formed about a thin sheet of material and the skin core passage conforms with the shape of one of a first surface and a second surface along which the skin core passage extends;
casting a material about said negative image;
removing said negative image from a cast component; and
wherein the aft edge defines an end of the first surface and the second surface at a same location.

28. The method of claim 27, wherein defining a negative image comprises defining the negative image using a refractory metal core and wherein casting the material about said negative image is an investment casting process.

29. The method of claim 27, wherein defining a negative image comprises defining the negative image using a ceramic core.

* * * * *